(12) United States Patent
Wang et al.

(10) Patent No.: US 11,866,640 B2
(45) Date of Patent: Jan. 9, 2024

(54) WELL CORROSION CONTROL

(71) Applicant: Saudi Arabian Oil Company, Dhahran (SA)

(72) Inventors: Qiwei Wang, Dhahran (SA); Hassan Ali Al-Ajwad, Dhahran (SA); Tao Chen, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/704,809

(22) Filed: Mar. 25, 2022

(65) Prior Publication Data

US 2023/0303910 A1 Sep. 28, 2023

(51) Int. Cl.
   *C09K 8/54* (2006.01)

(52) U.S. Cl.
   CPC ............ *C09K 8/54* (2013.01); *C09K 2208/32* (2013.01)

(58) Field of Classification Search
   CPC ............................. C09K 8/54; C09K 2208/32
   See application file for complete search history.

(56) References Cited

U.S. PATENT DOCUMENTS

| | | |
|---|---|---|
| 4,554,090 A | 11/1985 | Jones |
| 4,713,184 A | 12/1987 | Zaid |
| 4,787,455 A * | 11/1988 | Snavely, Jr. ............ C09K 8/528 507/224 |
| 5,002,126 A | 3/1991 | Carlberg et al. |
| 5,141,655 A | 8/1992 | Hen |
| 5,211,237 A | 5/1993 | Faircloth et al. |
| 5,346,009 A | 9/1994 | Lawson et al. |
| 5,346,010 A | 9/1994 | Adams et al. |
| 5,655,601 A | 8/1997 | Oddo et al. |
| 6,814,885 B2 | 11/2004 | Woodward et al. |
| 2007/0267193 A1 * | 11/2007 | Hills ..................... C09K 8/528 166/264 |

FOREIGN PATENT DOCUMENTS

GB 2306465 A * 5/1997 ............... C02F 5/14

OTHER PUBLICATIONS

Graham et al., "Corrosion Inhibitors Squeeze Treatments—Misconceptions, Concepts and Potential Benefits," presented at the SPE International Oilfield Corrosion Conference and Exhibition, Aberdeen, Scotland, May 2014, 8 pages.

Jordan et al., "Assessment of Formation Damage Potential of Corrosion Inhibitor Squeeze Applications," Paper No. NACE-2016-7290, NACE International Corrosion Conference & Expo, 2016, 14 pages.

Kerver et al., "Corrosion Inhibitor Squeeze Technique—Field Evaluation of Engineered Squeezes," Journal of Petroleum Technology, Jan. 1965, 17(01):50-58, 9 pages.

Kokal et al., "Cost Effective Design of Corrosion Inhibitor Squeeze Treatments for Water Supply Wells," presented at the Middle East Oil Show and Conference, Feb. 1999, 24 pages.

Nasr-El-Din et al., "Formation Damage Resulting from Biocide/Corrosion Inhibitor Squeeze Treatments," presented at the SPE International Symposium on Formation Damage Control, Feb. 2000, 19 pages.

Poetker et al., "Case Histories Show Value of Corrosion Inhibitor Squeeze Treatment," Journal of Petroleum Technology, Jun. 1960, 12(06):36-40, 5 pages.

Rosser et al., "Injection Water Treatment at the Source: Biocide-Enhanced Corrosion Inhibitor Squeeze Treatments of Water Supply Wells in a Central Arabia Oilfield," presented at the SPE International Symposium on Oilfield Chemistry, Houston, Texas, Feb. 1999, 13 pages.

Sanders et al., "Assessment of combined scale/corrosion inhibitors—A combined jar test/bubble cell," Journal of Petroleum Science and Engineering, 2014, 118:126-139, 26 pages.

* cited by examiner

*Primary Examiner* — Kumar R Bhushan
(74) *Attorney, Agent, or Firm* — Fish & Richardson P.C.

(57) ABSTRACT

A method and system for corrosion control and scale control in water supply for injection, including specifying a corrosion inhibitor for squeeze treatment of a water supply well, specifying a scale inhibitor that can form a complex with the corrosion inhibitor, pumping the corrosion inhibitor and the scale inhibitor through a wellbore of the water supply well into an aquifer in a subterranean formation, forming the complex of the corrosion inhibitor and the scale inhibitor, and pumping water from the water supply well to an injection well for injection, the water including the scale inhibitor released from the complex in the aquifer and the corrosion inhibitor released from the complex in the aquifer.

8 Claims, 11 Drawing Sheets

WELL CORROSION CONTROL

TECHNICAL FIELD

This disclosure relates to corrosion control in the production of water for injection.

BACKGROUND

A common application for produced water is injection into oil-producing formations to enhance (increased) oil production. Water injection or water flooding may be water injected into an oil reservoir to maintain reservoir pressure or to drive oil towards production wells. Water injection wells may be located onshore or offshore to increase oil recovery from an existing reservoir. Produced water (aquifer water) is a source of bulk water utilized for injection for recovery of oil. Aquifer water may be from water-bearing formations other than the oil reservoir, but can be in the same structure.

SUMMARY

An aspect relates to a method of corrosion control and scale control in water supply for injection, including specifying a corrosion inhibitor for squeeze treatment of a water supply well, specifying a scale inhibitor that can form a complex with the corrosion inhibitor, and pumping the corrosion inhibitor and the scale inhibitor through a wellbore of the water supply well into an aquifer in a subterranean formation. The method includes forming the complex of the corrosion inhibitor and the scale inhibitor. The method includes pumping water from the water supply well to an injection well for injection, the water including the scale inhibitor released from the complex in the aquifer and the corrosion inhibitor released from the complex in the aquifer.

Another aspect is a method of corrosion control and scale control in water supply for injection, including specifying a corrosion inhibitor for a water supply well, specifying a scale inhibitor that forms a complex with the corrosion inhibitor, and pumping the corrosion inhibitor and the scale inhibitor through a wellbore of the water supply well into an aquifer in a subterranean formation, wherein the scale inhibitor forms the complex with the corrosion inhibitor. The method includes providing water from the aquifer via the water supply well to an injection pump at an injection well, the water including the scale inhibitor released from the complex in the aquifer and the corrosion inhibitor released from the complex in the aquifer.

Yet another aspect relates to a method of corrosion control and scale control in water supply for injection, including specifying a corrosion inhibitor for a batch squeeze treatment of a water supply well, specifying a scale inhibitor that forms a complex with the corrosion inhibitor for the batch squeeze treatment, wherein the scale inhibitor forms the complex with the corrosion inhibitor during the batch squeeze treatment. The method includes performing the batch squeeze treatment. The batch squeeze treatment includes combining the corrosion inhibitor and the scale inhibitor at Earth surface to give a mixture of the corrosion inhibitor and the scale inhibitor, pumping the mixture through a wellbore of the water supply well into an aquifer in a subterranean formation, pumping water through the wellbore into the aquifer to displace the corrosion inhibitor and the scale inhibitor further into the aquifer, and shutting in the water supply well for interaction of the scale inhibitor with formation rock in the aquifer. The method includes placing the water supply well into service, thereby supplying water from the aquifer to an injection well, wherein the water supplied from the aquifer includes the scale inhibitor released from the complex in the aquifer and the corrosion inhibitor released from the complex in the aquifer.

The details of one or more implementations are set forth in the accompanying drawings and the description below. Other features and advantages will be apparent from the description and drawings, and from the claims.

DETAILED DESCRIPTION

Figure 1:
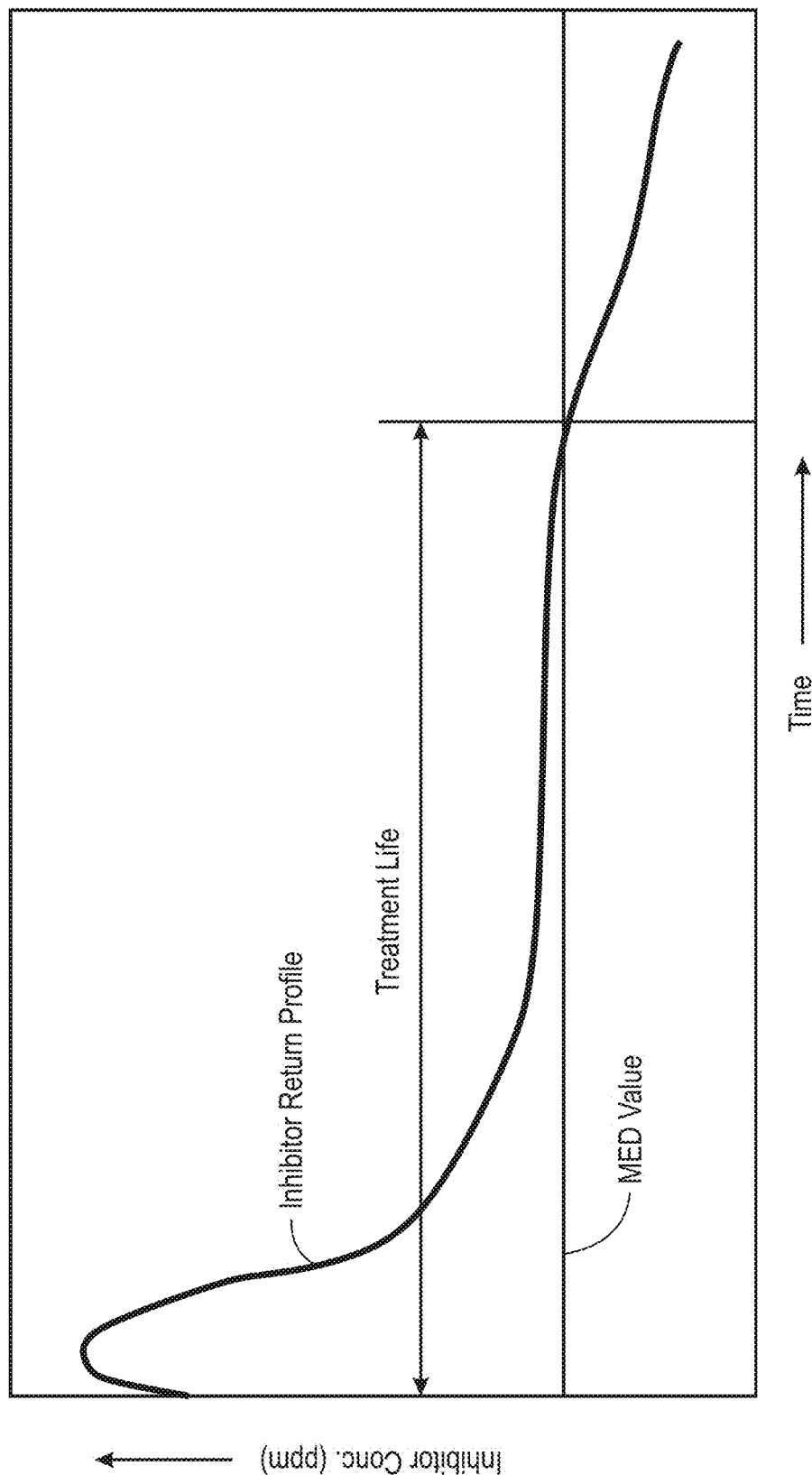
FIG. 1 is a plot indicating an example of inhibitor return and associated treatment life of squeeze treatment.

Aspects of the present disclosure relate to reducing corrosion caused by water produced for injection. In particular, embodiments of the present techniques may increase the squeeze treatment life of corrosion inhibitor in the source aquifer well. To do so, a scale inhibitor (having relatively long downhole retention) may be strategically selected and applied with the corrosion inhibitor into the source well (aquifer reservoir) to form a complex (of the scale inhibitor and the corrosion inhibitor) in the reservoir. Advantageously, this may increase (enhance) retention of the corrosion inhibitor by the source reservoir rock. Thus, the peak concentration of the corrosion inhibitor early in flowback of the produced water from the source well may be beneficially reduced. The release of the corrosion inhibitor and the scale inhibitor simultaneously from the formed complex in the aquifer reservoir for flowback may extend corrosion protection (while also providing for scale control) in [1] the source well (e.g., aquifer well), [2] the well (e.g., injection well) that receives the produced water for injection, and [3] the intermediate transfer equipment (e.g., piping) between the water source well and the injection well.

Embodiments may involve: (1) identifying a corrosion inhibitor having acceptable corrosion inhibition efficacy (e.g., based on laboratory tests, field treatment history, commercial data, etc.); (2) selecting a scale inhibitor able to form a complex with the identified corrosion inhibitor based on testing (e.g., at ambient and via an oven); (3) pumping the identified corrosion inhibitor and the selected scale inhibitor (e.g., as a mixture) into the source water well (into the water aquifer reservoir layer); (4) shutting-in the source well for up to 24 hours to allow the pumped inhibitors to form a complex, react with reservoir rock, and be retained; and (5) producing water from source well to the injection well, and with inhibitors beneficially released gradually from aquifer reservoir rock for flowback in the produced water. Depending on the particular corrosion inhibitor and the particular scale inhibitor, the complex may form at surface in the mixing of the corrosion inhibitor and the scale inhibitor, during the pumping of the mixture, and/or in the aquifer. See, e.g., Tables 2-4 in the Example below.

The corrosion inhibitor may be dispersible in water but generally insoluble in water. The scale inhibitor may be soluble in water. The complex may be generally insoluble in water. The corrosion inhibitor (generally relatively weak interaction with reservoir rock) and the scale inhibitor (generally relatively strong interaction with the reservoir rock) are retained by the aquifer reservoir rocks, such as by chemical bonding between functional group(s) of the inhibitor and atoms in reservoir rock, by Van der Waals forces, and/or by adsorption/desorption, imbibition/diffusion, and the like. Scale inhibitors are typically retained by the reservoir rock significantly longer than are corrosion inhibitors. Advantageously, with forming the complex, the retention of the corrosion inhibitor is increased due to being in the complex with the scale inhibitor.

Aquifer water is commonly used as the injection water to enhance and sustain oil production. Aquifer water can corrosively damage water supply well systems including casing, tubing, electric submersible pump (ESP), and surface flowlines (piping). Aquifer water can be corrosive to completion components of the injection well receiving the water. Unfortunately, conventional squeeze treatment of corrosion inhibitors into the source water well may result in flowback of the applied corrosion inhibitors quickly, such as within 1 week to 2 weeks after treatment due to weak interaction of the corrosion inhibitor with the aquifer reservoir rocks. The residual concentration of the corrosion inhibitor relatively quickly falls below the minimum required value, giving a short squeeze treatment life and significant waste of applied corrosion inhibitor chemical.

Embodiments herein relate to a technique to increase the corrosion-inhibitor squeeze treatment life in a water source reservoir via utilization of scale inhibitors. A scale inhibitor may be selected based on ability of the scale inhibitor to form a complex with the pre-selected corrosion inhibitor. The complex under reservoir conditions may enhance retention of corrosion inhibitor by the reservoir and reduce peak concentration of corrosion inhibitor during early stage of flowback. The controlled releases of corrosion and scale inhibitors simultaneously from the complexes may provide extended corrosion protection (and provide scale control) for water supply well systems. Benefits may include increased chemical treatment efficiency, contemporaneous (simultaneous) corrosion and scale treatment, reduce treatment frequency, and decreased chemical usage and treatment cost.

Water injection is a commonly employed engineering technique to improve (increase) oil production. In this operation, water is pumped into the subterranean oil-bearing zone to increase the depleted oil reservoir pressure and can sweep the oil in place toward production wells. An underground water reservoir is one source for injection water. Water is extracted by water supply wells from the water reservoir, transported to the injection wells via a flowline(s) (piping), and then forced into the oil producing subterranean layer. An electrical submersible pump (ESP) may be installed in the water supplier well to meet the demand for high volume of injection water.

Aquifer waters can contain dissolved salts and corrosive gases, such as carbon dioxide ($CO_2$) and traces of hydrogen sulfide ($H_2S$) and oxygen ($O_2$). These impurities can damage the injection water system. The damage can include corrosion and scale deposition. The injection water system subjected to such damage may include the downhole completion of the water supply well, the surface transfer piping to the injection well, the casing (tubular) in the injection well, and the near wellbore region of the injection well. Treatment chemicals, such as corrosion inhibitor and scale inhibitor, are implemented to protect the system from corrosion attack and scale formation.

Inhibitors can be added to the supply waters by continuous injection (into flowing water at surface) and batch squeeze treatment (into the water supply well). Continuous injection may utilize a metering pump to withdraw inhibitor product from a tank (vessel) and add the inhibitor via tubing (e.g., capillary tubing) at a pre-calculated pumping rate (via the metering pump) to a surface conduit conveying the water stream flowing from the supply well. Installation of the capillary tubing on existing wells may require expensive workover. Operation cost of continuous injection may be high due to frequent maintenance of the metering pump and refill of the chemical tank. In addition, the surface continuous-injection treatment is only effective downstream of injection point and therefore does not protect casing of the upstream water supply well.

Batch squeeze treatment of water supply wells may involve pumping chemicals, either neat or diluted, into the well to the aquifer reservoir layer, followed by pumping water into the well to push the chemical away from the wellbore. The pumping of the chemicals and the follow-up push water may expose the pumped chemical to reservoir rocks for interaction of the chemicals with the reservoir rock. The pumping of the follow-up water push may be designed (configured) to expose the pumped chemical to more reservoir rocks for more interaction of the chemicals with the reservoir rock. The well may be shut in (e.g., for a duration in the range of 4 hours to 24 hours) to allow the pumped chemical to react with reservoir rocks and be retained. When water production from the water source well (from the aquifer reservoir) is initiated or resumes, the retained chemical may release slowly into the water stream to provide long-term protection. In contrast, chemical not retained flows back quickly with the produced water.

Scale inhibitor typically beneficially has strong interaction with the reservoir rocks (e.g., in particular with carbonates and clays), and can be effective at low concentration [e.g., 2 parts per million (ppm) to 5 ppm] in the produced supply water to prevent or reduce scale formation (e.g., calcium carbonate scale formation) by the supply water. Thus, for scale inhibitors, this may yield long squeeze treatment life, e.g., in the range of 6 months to 12 months.

FIG. 1 is a plot indicating example inhibitor return and treatment life of squeeze treatment. Treatment life (e.g., for a batch squeeze treatment) may be defined as the duration (period-of-time) for the concentration of the inhibitor (corrosion inhibitor or scale inhibitor) in the produced supply water to fall below the minimum effective dose (MED) (e.g., a value in ppm). Again, in implementations, the corrosion inhibitor or scale inhibitor may be retained by aquifer reservoir rock and released into the supply water produced from the aquifer.

Corrosion inhibitor compounds generally have weaker interaction with aquifer reservoir rocks than do scale inhibitors. Typically, only a relatively small amount of pumped corrosion inhibitor is retained by the reservoir and thus most of the chemical flowback of the corrosion inhibitor occurs quickly after treatment. Further, unlike scale inhibition, relatively high concentrations of corrosion inhibitor are implemented to provide adequate protection from corrosiveness of aquifer water in some cases. The low retention of the corrosion inhibitor in the reservoir combined with the typically relatively high MED of the corrosion inhibitor may lead to a short squeeze treatment life. Example field data showed that the corrosion inhibitor concentration dropped below 5 ppm after 1 week of the squeeze treatment (after 1 week of the pumping of the corrosion inhibitor into water supply well) (see, e.g., FIG. 2 and FIG. 3).

Figure 2:
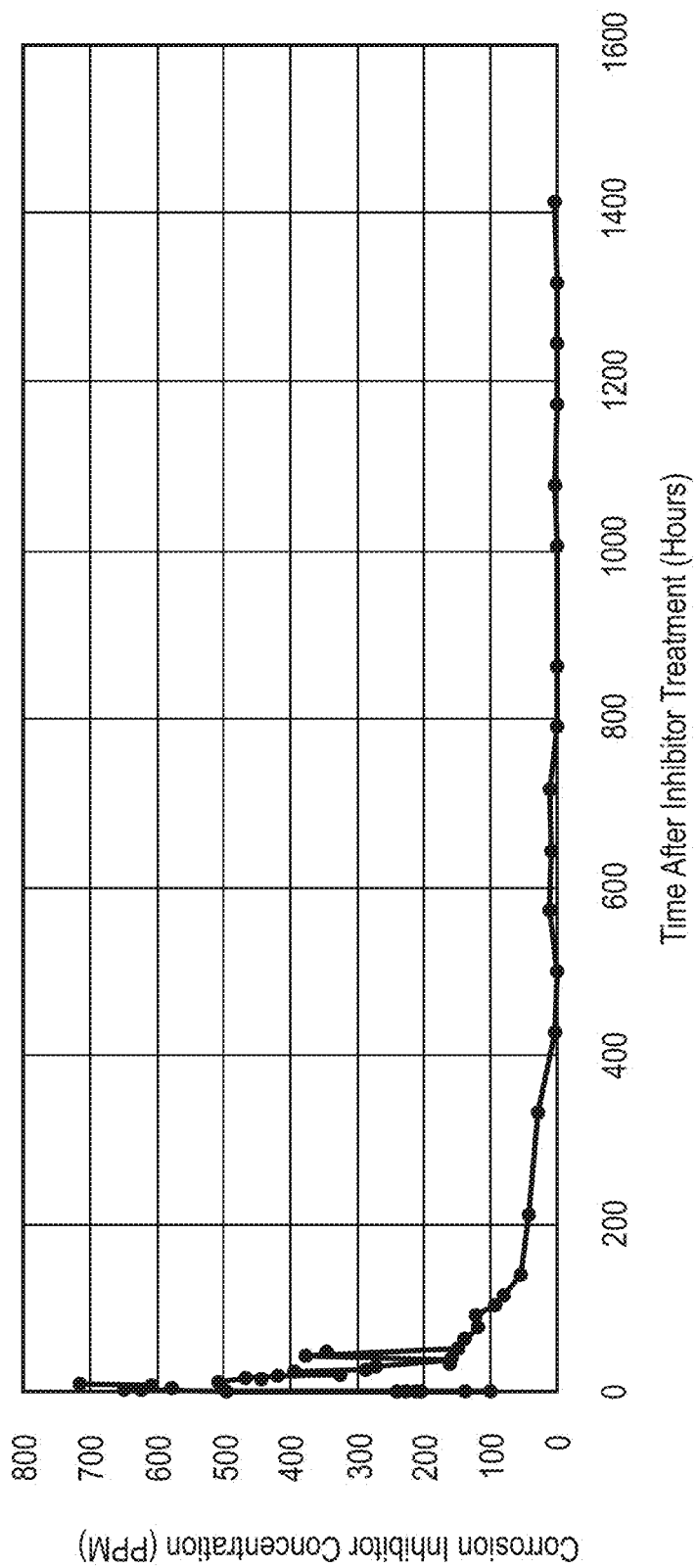
FIG. 2 is a plot of the concentration of a corrosion inhibitor in produced water from a source well over time after treatment of the source well with the corrosion inhibitor.

FIG. 2 is a plot of the concentration of a corrosion inhibitor in produced water from a source well over time after treatment of the source well with the corrosion inhibitor. The data is actual field data. The corrosion inhibitor is CI-1 described in the Example below. The plot in FIG. 2 can be described as corrosion inhibitor residual analysis after corrosion-inhibitor squeeze treatment for water supply well #A treated with corrosion inhibitor CI-1.

Figure 3:
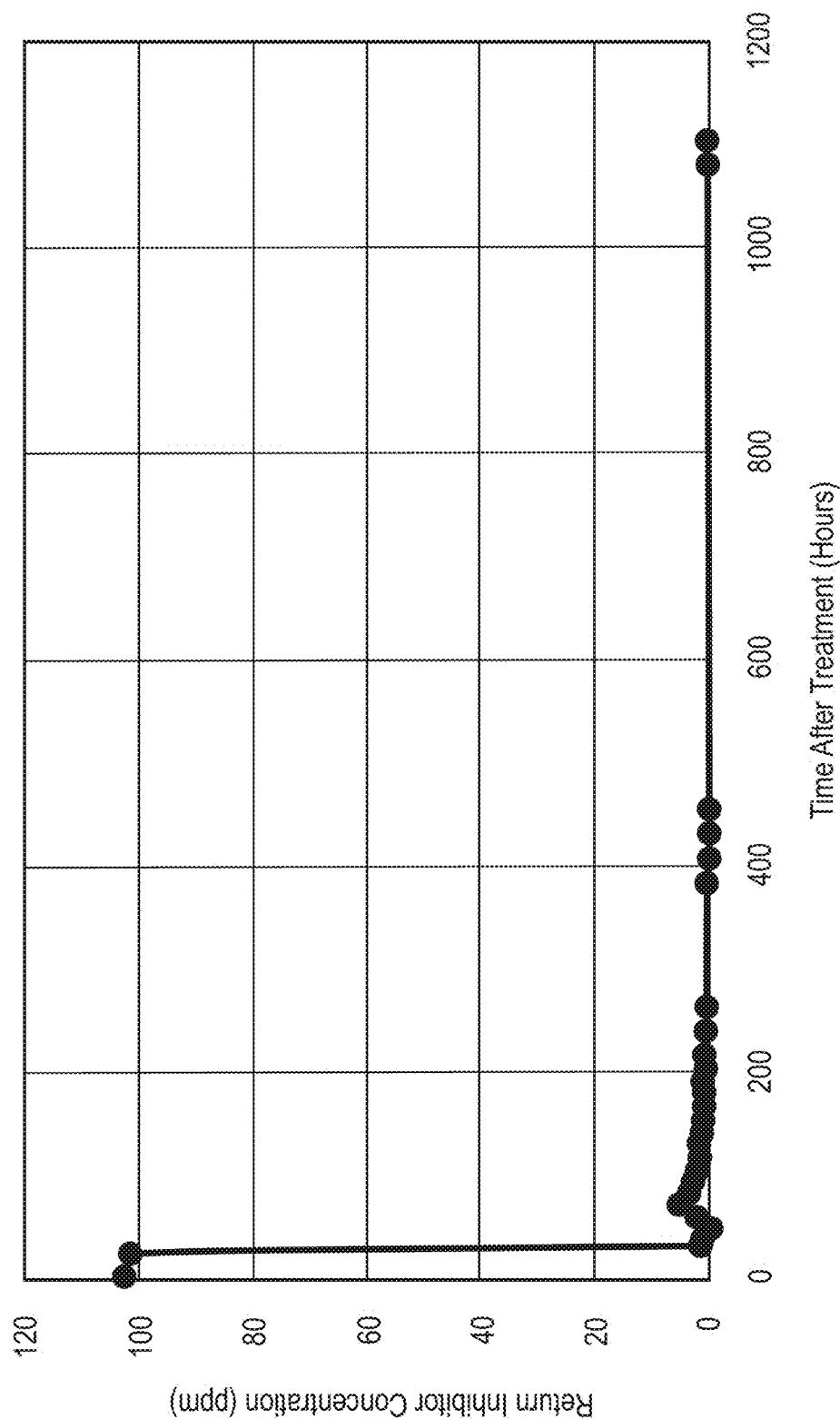
FIG. 3 is a plot of the concentration of a corrosion inhibitor in produced water from a source well over time after treatment of the source well with the corrosion inhibitor.

FIG. 3 is a plot of the concentration of a corrosion inhibitor in produced water from a source well over time after treatment of the source well with the corrosion inhibitor. The data is actual field data. The corrosion inhibitor is CI-2 described in the Example below. The plot in FIG. 3 can be described as residual inhibitor concentration in water samples collected after corrosion-inhibitor (CI) squeeze treatment of water supply well #B treated with corrosion inhibitor CI-2 described in the Example below. The water supply well #B is in a different field (aquifer) from well #A.

Figure 4:
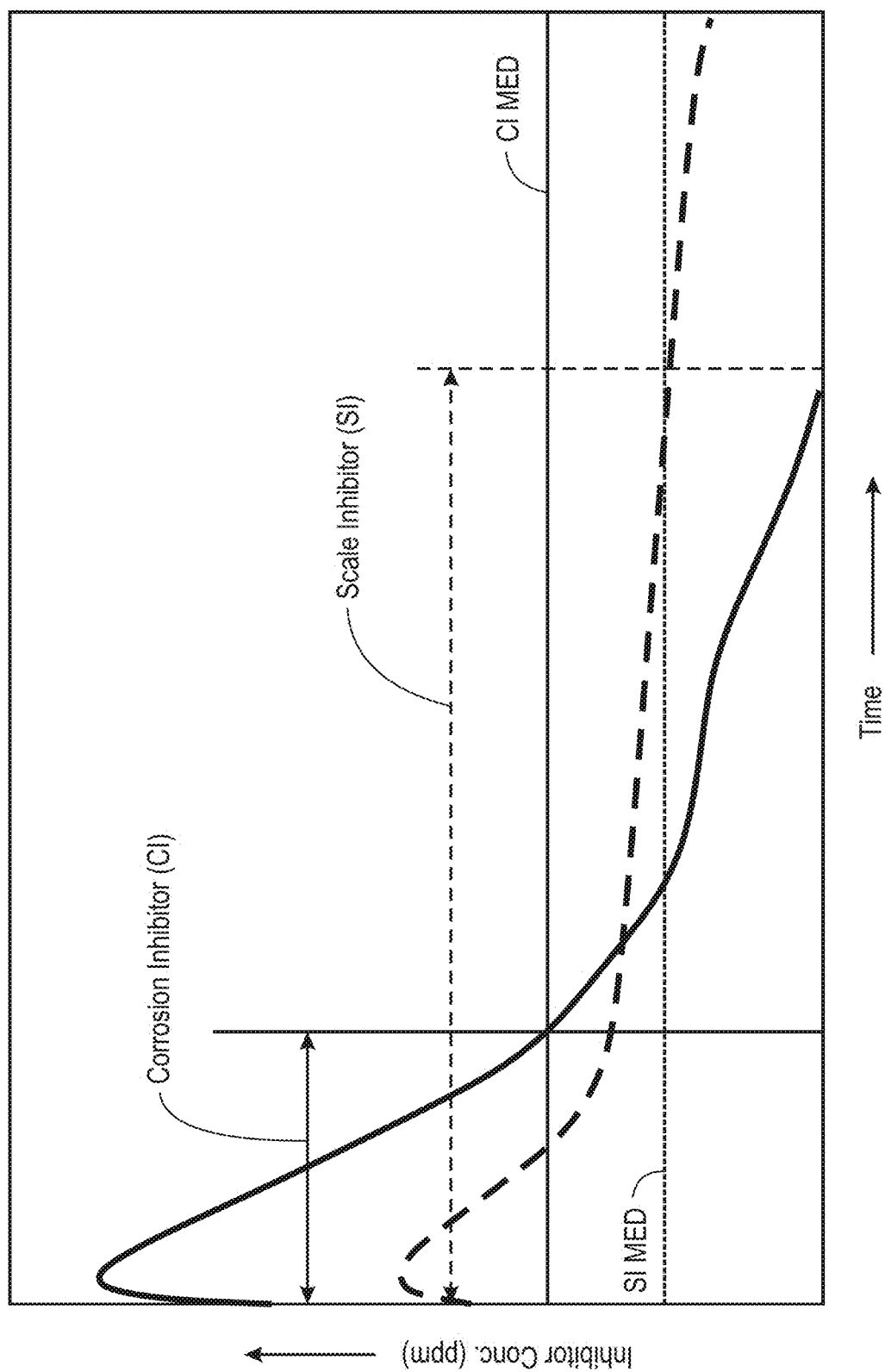
FIG. 4 is a plot depicting performance of squeeze treatments of a typical scale inhibitor and a typical corrosion inhibitor.

FIG. 4 is a plot depicting performance of squeeze treatments of a typical scale inhibitor and a typical corrosion inhibitor (not formed as a complex). The plot is a comparison of conventional corrosion inhibitor (CI) and scale inhibitor (SI) squeeze treatments. The scale inhibitor (represented by dashed lines) returns at lower concentration in initial flowback (than does the corrosion inhibitor) and at higher concentration later (than does the corrosion inhibitor. The scale inhibitor has a lower minimum effective dose (MED) value than the corrosion inhibitor. These factors yield long squeeze treatment life for the scale inhibitor. The corrosion inhibitor flows back at higher concentration initially due to weaker interaction with reservoir rocks and decreases below the MED value quickly, resulting in a short treatment life.

Embodiments improve (increase) the squeeze treatment life for the typical corrosion inhibitor by enhancing retention of the corrosion inhibitor by the aquifer reservoir. To form insoluble complexes, the techniques may rely on the potential incompatibility between some scale inhibitor and corrosion inhibitor molecules. The formed insoluble complexes effectively retain the corrosion inhibitor into the aquifer reservoir. During water production, the complexes may be gradually decompose or dissolve, producing (releasing, giving) corrosion and scale inhibitors at concentrations above their MED values to protect the water supply wells for extended periods, as indicated, for example, in FIG. 5.

Figure 5:
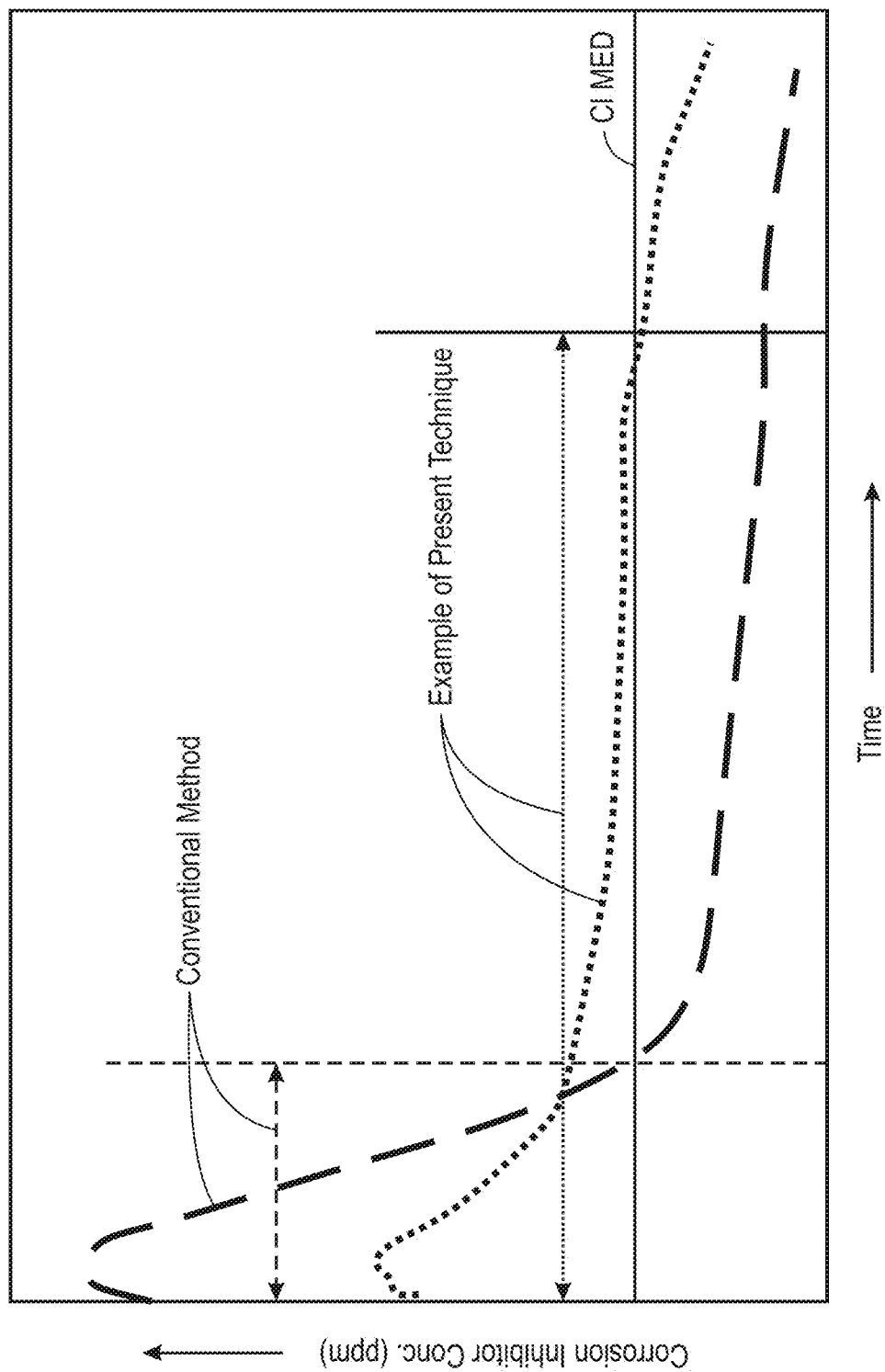
FIG. 5 is a plot as a representation that compares conventional corrosion-inhibitor squeeze treatments with an example of the corrosion-inhibitor squeeze treatment disclosed herein.

FIG. 5 is a plot as a representation that compares conventional corrosion-inhibitor squeeze treatments with an example of the corrosion-inhibitor squeeze treatment disclosed herein. The corrosion inhibitor (CI) MED is noted. The vertical dashed line is the conventional treatment life. The vertical solid line is the treatment life (longer) for this present example. Conventionally, the corrosion inhibitor is simply applied. In contrast, embodiments herein form a complex of the corrosion inhibitor with a scale inhibitor, and the two applied together so that the retention of the corrosion inhibitor is increased. As can be seen in the plot of FIG. 5, the treatment life is extended with the depicted present representation.

Figure 6:
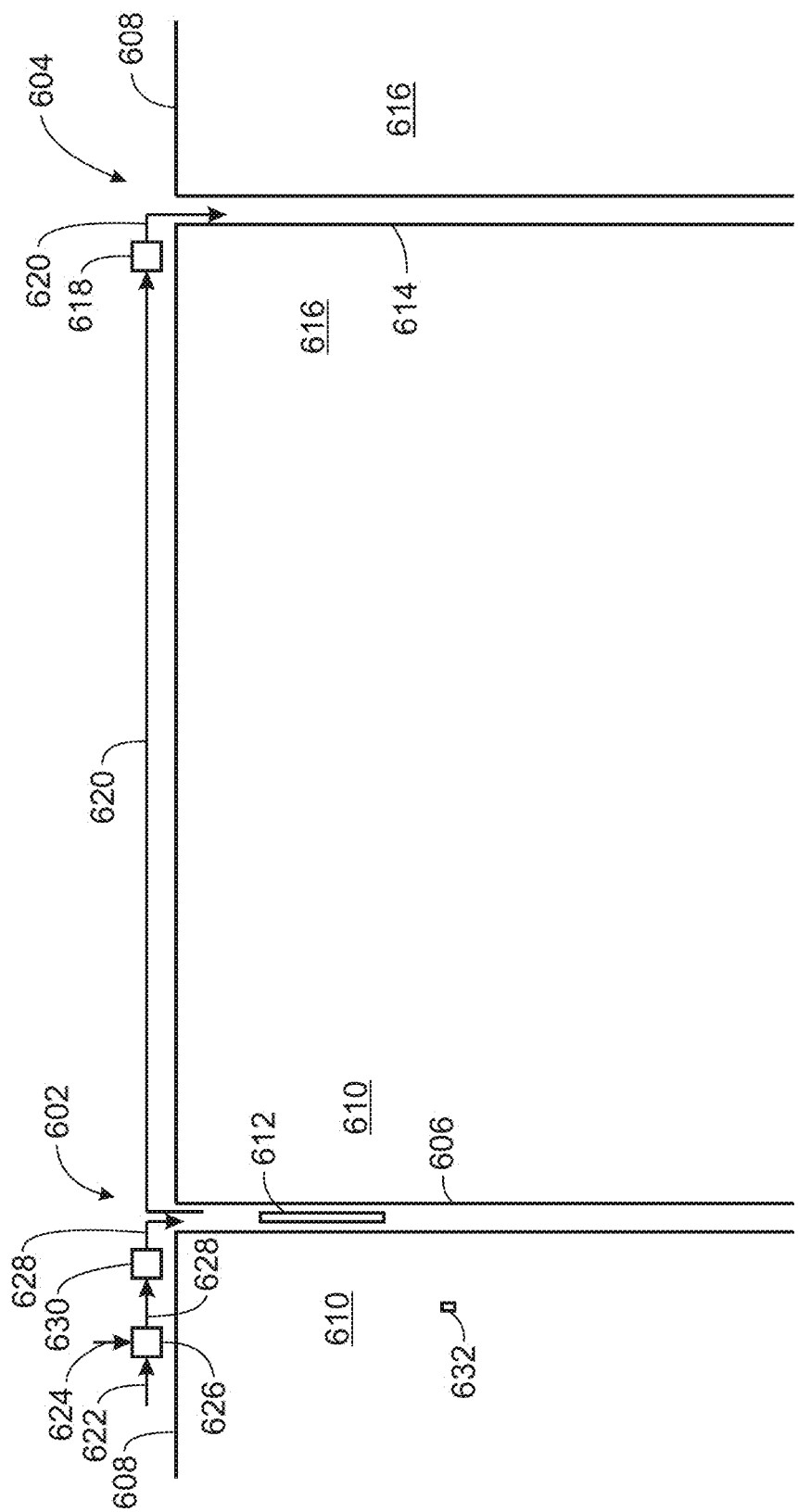
FIG. 6 is a diagram of a water supply well and an injection well.

FIG. 6 is a water supply well 602 (water well) and an injection well 604. The water supply well 602 includes a wellbore 606 formed through the Earth surface 608 into a subterranean formation 610 (in Earth crust) having an aquifer that may be known as an aquifer reservoir or water reservoir. The water supply well 602 may include an ESP 612 to provide (pump) water from the aquifer to the surface 608. In particular, the water may flow from the aquifer (in the subterranean formation 610) into the wellbore 606 to the pump inlet (suction) of the ESP 612. For cased portions of the wellbore 606, the water may flow from the aquifer through perforations in the casing into the wellbore 606. In operation, the ESP 612 may pump and discharge the received water to the surface 608, such as for provision to the injection well 602 for injection.

The injection well 604 includes a wellbore 614 formed through the Earth surface 608 into a subterranean formation 616 (in Earth crust) having an oil reservoir that includes crude oil. Natural gas and/or other hydrocarbons may be present in the subterranean formation 616. The injection well 604 may include a surface pump 618 (injection pump) (e.g., centrifugal pump or positive displacement pump) that pumps (injects) water 620 through the wellbore 614 into the oil reservoir in the subterranean formation 616. The water 620 injected may be water produced (supplied) from the water supply well 602 and as received at the injection well 604. The water 620 may have a corrosion inhibitor 622 and a scale inhibitor 624. For cased portions of the wellbore 614, the injected water 620 may flow through perforations in the casing into the oil reservoir in the subterranean formation 616. The water 620 may be injected (pumped) into the oil reservoir to maintain pressure (or facilitate pressure maintenance) of the oil reservoir. The water 620 may be injected (pumped) into the oil reservoir (e.g., for water flooding) to displace oil in the oil reservoir through the subterranean formation 616 toward (and to) a production well. The displaced oil may be produced to Earth surface via the production well.

The water supply well 602 may have a vessel 626 (e.g., tank) at surface 608 to combine (mix) the corrosion inhibitor 622 and the scale inhibitor 624 to give a mixture 628 of the corrosion inhibitor 622 and the scale inhibitor 624. In other implementations, the corrosion inhibitor 622 and the scale inhibitor 624 may be combined (mixed) offsite to give the mixture 628. The vessel 626 may be, for example, a tank or container resting on the Earth surface 608 or on a vehicle (e.g., truck) at the surface 608, and the like. The water well 602 may have a surface pump 630 (e.g., centrifugal pump or positive displacement pump) to pump the mixture 628 of the corrosion inhibitor 622 and the scale inhibitor 624 through the wellbore 606 into the aquifer in the subterranean formation 610.

The corrosion inhibitor 622 may be, for example, an amine-based corrosion inhibitor. The scale inhibitor 624 may include, for example, an organic phosphate (compound), such as a phosphonate or a phosphate ester. The scale inhibitor 624 may include, for example, a polymeric compound having a carboxyl group. The polymeric compound may have a molecular mass (which may be labeled as molecular weight) less than 5000 atomic mass units (amu) [grams per mole (g/mol)].

A complex 632 of the corrosion inhibitor 622 and the scale inhibitor 624 in the mixture 628 may form in the vessel 626, during the pumping of the mixture 628, and/or in the aquifer in the formation 610. See the Example below (Tables 2-4) for example conditions in which example corrosion inhibitors form a complex with example scale inhibitors. The complex 632 may reside (be disposed) in the aquifer. The complex 632 may be retained by formation rock (e.g., carbonate, clay, etc.) in the aquifer. The interaction of the scale-inhibitor 624 portion of the complex 632 may promote retention of the complex 632 by the formation rock.

A complex, in chemistry, may be a substance, either an ion or an electrically neutral molecule, formed by the union of simpler substances (as compounds or ions) and held together by forces that are chemical (i.e., dependent on specific properties of particular atomic structures) rather than physical. A complex may be a molecular entity formed by loose association involving two or more component molecular entities (ionic or uncharged), or the corresponding chemical species, and in which the bonding between the components is typically weaker than in a covalent bond.

The forming of the corrosion inhibitor 622 with the scale inhibitor 624 as the complex 632 may be confirmed empirically (such as in the Example below). The retention of the complex 632 in the aquifer and the gradual release of the corrosion inhibitor 622 and the scale inhibitor 624 may be confirmed empirically, such as in measuring concentration of the corrosion inhibitor 622 and the scale inhibitor 624 in the produced water 620.

The complex 632 of the corrosion inhibitor 622 and the scale inhibitor 624 may be initially insoluble in water at reservoir conditions (e.g., temperature, pressure, etc.) of the aquifer. In implementations, the complex 632 may be insoluble in water at conditions of the aquifer reservoir over the treatment life of the water supply well with the corrosion inhibitor 622 and the scale inhibitor 624. The treatment life may be batch-squeeze treatment life and as discussed with respect to preceding figures.

The water supply well 602 may produce water 620, such as via ESP 612. As discussed, water may flow from the aquifer (in the subterranean formation 610) into the wellbore 606 to the pump inlet of the ESP 612. The ESP 612 may pump and discharge the received water to the surface 608 as produced water 620. The water 620 may include the corrosion inhibitor 622 and the scale inhibitor 624 as released from the complex 632 disposed in the aquifer. The corrosion inhibitor 622 and the scale inhibitor 624 (released from the complex 632) in the water 620 may inhibit corrosion and scale, respectively, of completion structure in the water supply well 602 and the injection well 604 (and of surface transfer equipment for the routing of the water 620 from the water supply well 602 to the injection well 620).

Over time, the complex 632 in the aquifer may gradually dissolve or decompose back into the corrosion inhibitor 622 and the scale inhibitor 624. The scale inhibitor 624 and the corrosion inhibitor 622 releasing from the complex 632 may involve the complex 624 gradually decomposing or dissolving. The complex 632 in the water in the aquifer (and as retained by formation rock) may dissolved over time into the separate corrosion inhibitor 622 and the separate scale inhibitor 624. Again, the produced water 620 may thus beneficially include the corrosion inhibitor 622 and the scale inhibitor 624.

The produced water 620 for injection may be routed along the surface 608 from the water supply well 602 to the injection well 604. For instance, the water 620 may flow through a conduit (piping) from the water supply well 602 to the injection well 604. Motive force for flow of the water 620 may be provided, for example, by the ESP 612. The water 620 may exit the wellbore 606 through a wellhead (not shown) at the surface 608 at the water well 602 into the conduit transporting the water 620 to the injection well 604. If desired or needed, a surface booster pump (e.g., centrifugal pump) may be disposed along the conduit conveying the water 620. At the injection well 604, a surface vessel (not shown) may receive the water 620 from the conduit. As discussed, the injection pump 618 may pump the water 620 into the wellbore 614.

In some implementations, a vehicle (e.g., truck) (e.g., multiple vehicles) with a mounted vessel (e.g., a tank on a vehicle bed or trailer) having the water 620 may transport the water 620 from the water supply well 602 to the injection well 620 for injection. Other configurations for delivering the water 620 from the supply well 602 to the injection well 604 are applicable.

The completion architecture (e.g., wellbore casing and tubing, and associated metal components) and surface structure of the supply well 602 and the injection well 604, as well as the transfer equipment (e.g., conduit, etc.) along the surface 608 may typically be metal. The metal may be, for example, mild steel, carbon steel, or stainless steel (or other metal alloys). The metal may be susceptible to corrosion and scale deposition by the water 620. As mentioned, agents (compounds) in the water 620 that are corrosive and/or contribute to scale formation may include, for example, dissolved salts and corrosive gases. The corrosive gases may include, for instance, carbon dioxide ($CO_2$) and traces of hydrogen sulfide ($H_2S$) and oxygen ($O_2$). The corrosion inhibitor 622 may interact with (or otherwise address) these agents to prevent or reduce (e.g., reduce rate of) corrosion of the metal. The scale inhibitor 624 may interact with (or otherwise address) these agents to prevent or reduce (e.g., reduce rate of) scale formation on the metal.

The corrosion inhibitor 622 as available (e.g., commercially available) may be provided in a formulation (composition) with additional components. Likewise, the scale inhibitor 624 as available (e.g., commercially available) may be provided in a formulation (composition) with additional components. These additional components may be included for dilution, as stabilizers (for shelf life), as viscosity modifiers, and so forth. The phrase "corrosion inhibitor" may refer to the primary or active component(s) (for reducing or preventing corrosion) of the composition received from the vendor. The phrase "scale inhibitor" may refer to the primary or active component(s) (for reducing or preventing scale formation) of the composition received from the vendor. The vendor supplied formulation having the corrosion inhibitor 622 and the vendor supplied formulation having the scale inhibitor 624 may each be provided to the vessel 626 and combined (mixed) in the vessel 626. This mixture of the two formulations (compositions) may be the mixture 628 having the corrosion inhibitor 622 and the scale inhibitor 624.

A corrosion inhibitor is generally a chemical compound that, when included in water, decreases the corrosion rate of a material (typically a metal or an metal alloy) in contact with the water. The corrosion inhibitor may neutralize the corrosive agent(s) in the water. The corrosive agents in the water in the present context may include, for instance, oxygen, hydrogen sulfide, and carbon dioxide. Oxygen may be removed by reductive corrosion inhibitors such as amines and hydrazines. For instance, oxygen ($O_2$) (a common corrosive agent) may react with a hydrazine ($N_2H_4$) (if present) of a corrosion inhibitor. In particular, hydrazine may convert oxygen to water ($H_2O$), which is generally benign, and give nitrogen ($N_2$): $O_2+N_2H_4 \rightarrow 2H_2O+N_2$. Related inhibitors of oxygen corrosion as corrosion inhibitors are hexamine, phenylenediamine, dimethylethanolamine, and their derivatives. The corrosive agent $H_2S$ (which can corrode steels) in the water can be removed in implementations by conversion via an amine(s) (if present) of the corrosion inhibitor to a polysulfide(s).

As discussed, water for pressure maintenance in oil producing reservoirs is often obtained from wells that are drilled in water aquifers. Aquifer brine is corrosive and leads to the corrosion of well tubing, manifolds, and the water injection system. Downhole squeeze treatments with corrosion inhibitors may provide for controlling corrosion in supply wells and the injection system. Corrosion inhibitors (e.g., amine-type corrosion inhibitors) may be squeezed into the aquifer and the chemical returned with the produced water giving protection. Variables affecting a squeeze treatment (whether for corrosion inhibitor and/or scale inhibitor) may include the amount and concentration of inhibitor, volume of formation to contact, amount of overflush, the well shut-in time, etc. While downhole chemical squeeze treatments are common practice for deploying scale inhibitors to protect wellbores and downhole production tubulars from mineral or inorganic deposits, adoption of chemical squeeze treatments for corrosion inhibitor treatments is generally less commonplace historically because of typically anticipated poor lifetimes.

The use of a corrosion inhibitors to protect carbon steel equipment in the oil and gas industry is often more economical compared to the use of corrosion resistant alloys. As discussed herein, corrosion inhibitors can be evaluated for a corrosion inhibition program, Scale inhibitor molecules, e.g., either phosphonate or polymer based, may be designed to form an arrangement with, for example, calcium ions ($Ca^{2+}$) and/or barium ions ($Ba^{2+}$) In implementations, the scale inhibitor can also adsorb onto calcium salts or barium salts (carbonate and sulfate) to prevent or reduce growth of the salts (e.g., threshold effect).

Figure 7:
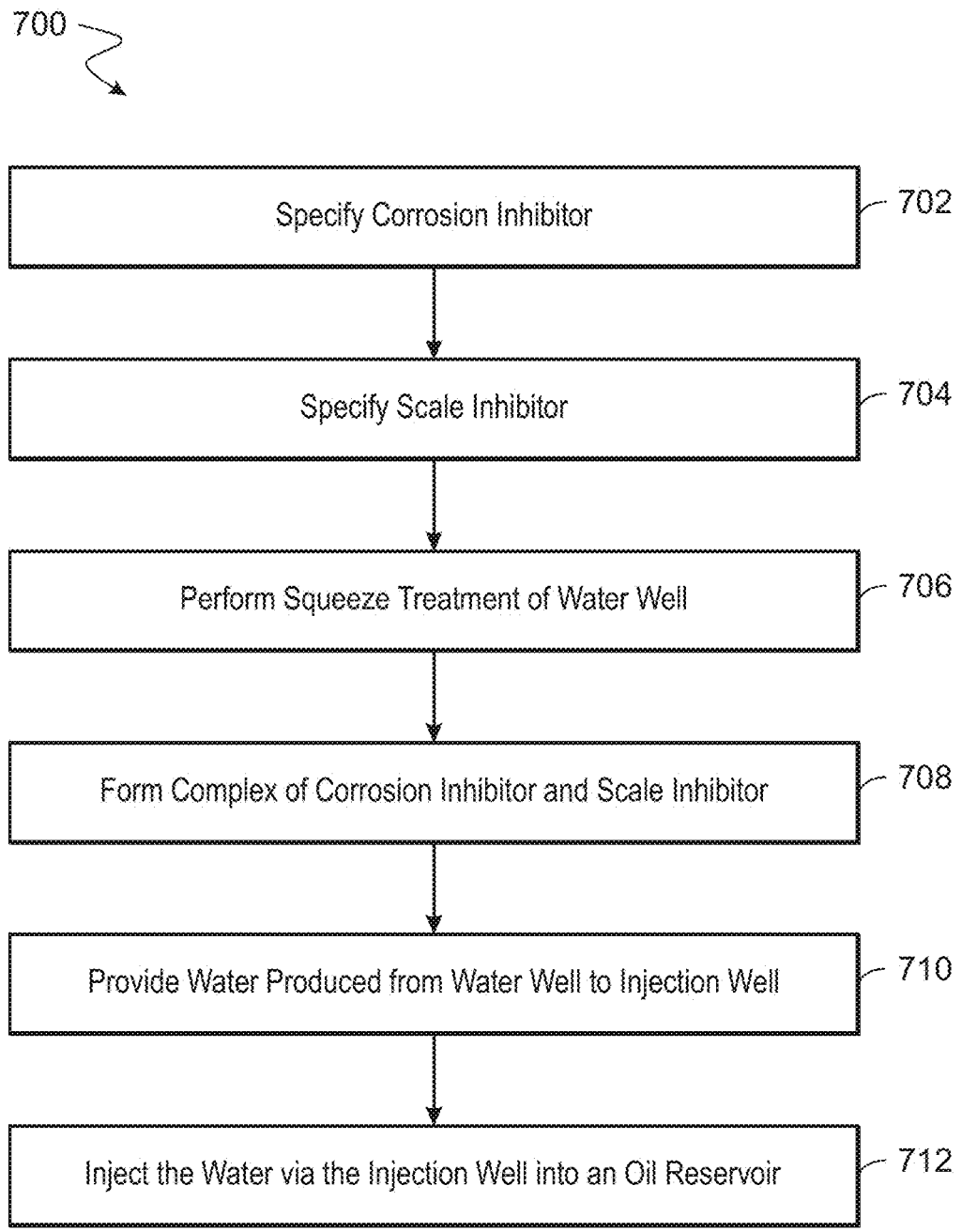
FIG. 7 is a block flow diagram of a method of corrosion control and scale control in water supply for injection.

FIG. 7 is a method 700 of corrosion control and scale control in water supply for injection. At block 702, the method includes specifying a corrosion inhibitor (e.g., an amine-based corrosion inhibitor) for squeeze treatment (e.g., batch squeeze treatment) of a water supply well. A squeeze treatment may be applying pump pressure to force a treatment fluid into a planned treatment zone downhole. A "batch" squeeze treatment may mean that the treatment chemicals (e.g., corrosion inhibitor, scale inhibitor, etc.) are injected initially as a batch and not on going but intermittently for additional batches.

At block 704, the method includes specifying a scale inhibitor that can form (or that forms) a complex with the corrosion inhibitor (e.g., for and during the squeeze treatment). The specifying of the scale inhibitor may involve evaluating that the scale inhibitor can form the complex with the corrosion inhibitor. As discussed, the scale inhibitor may be or include, for example, an organic phosphate compound or a polymeric compound having a carboxyl group, or a combination thereof.

The squeeze treatment with the scale inhibitor may be a type of inhibition treatment employed to control or prevent scale deposition. In a scale-inhibitor squeeze, the inhibitor may be pumped into a water-producing zone. The scale inhibitor is attached to the formation matrix (rock), for example, by chemical adsorption or by temperature-activated precipitation, and returns with the produced water at sufficient concentration to reduce or avoid scale precipitation. Again, scale inhibitors utilized in scale-inhibitor squeezes include, for example, phosphonated carboxylic acids or polymers.

At block 706, the method includes performing the squeeze treatment of the water supply well. In particular, the squeeze treatment (or preparation for the squeeze treatment may include combining (e.g., which may include mixing) the corrosion inhibitor and the scale inhibitor at Earth surface. The squeeze treatment may include: [1] providing (e.g., pumping) the corrosion inhibitor and the scale inhibitor (e.g., a mixture of the corrosion inhibitor and the scale inhibitor) through a wellbore of the water supply well into an aquifer in a subterranean formation; [2] pumping water (e.g., as an overflush) through the wellbore into the aquifer to displace the corrosion inhibitor and the scale inhibitor further into the aquifer; and [3] shutting in the water supply well (e.g., for 4 hours to 24 hours) for interaction of the scale inhibitor [and complex (block 708)](and potentially the corrosion inhibitor to some extent) with formation rock (reservoir formation rock) in the aquifer (reservoir).

Thus, the pumping of the corrosion inhibitor and the scale inhibitor through the wellbore of the water supply well into the aquifer may be a batch squeeze treatment of the water supply well with the corrosion inhibitor and the scale inhibitor. The squeeze treatment may include, after the pumping of the corrosion inhibitor and the scale inhibitor into the aquifer, pumping water (from Earth surface) through the wellbore of the water supply well into the aquifer to displace the corrosion inhibitor and the scale inhibitor further from the wellbore into the aquifer. Such may facilitate more interaction of the scale inhibitor with formation rock (e.g., having carbonate or clay, or both) in the aquifer. The squeeze treatment life of the water supply well with the corrosion inhibitor and the scale inhibitor may be at least 6 months. The treatment life of the batch squeeze treatment may be, for example, in the range of 6 months to 12 months.

At block 708, the method includes forming a complex of the corrosion inhibitor and the scale inhibitor. The complex may form in the squeeze treatment (block 706). The complex may form at Earth surface in the mixing of the corrosion inhibitor and the scale inhibitor and the storage of the mixture, during the pumping of the mixture, and/or with mixture in the aquifer. Such may depend on the conditions (e.g., including temperature) at the Earth surface (ambient), in the wellbore, and in the aquifer reservoir.

At block 710, the method includes providing (e.g., including pumping) water produced from the water supply well to an injection well for injection. At the conclusion of the squeeze treatment (block 706), the method may include placing the water supply well into service, thereby supplying water from the aquifer to the injection well, wherein the water supplied from the aquifer may include the scale inhibitor released from the complex in the aquifer and the corrosion inhibitor released from the complex in the aquifer. The produced water may be provided to an injection pump (at surface) at the injection well. The water from the aquifer may be produced via the water supply well to the injection well, such as to an injection pump at an injection well. The pumping of the water to the injection well may involve pumping the water via an ESP disposed in the wellbore of the water supply well. The supplying of the water from the aquifer to the injection well may include flowing the water from the aquifer through surface piping to the injection well. The supplying of the water from the aquifer to the injection well may include flowing the water from the aquifer through surface piping to a feed vessel for an injection pump at the injection well. As mentioned, this produced water may include the scale inhibitor released from the complex in the aquifer and the corrosion inhibitor released from the complex in the aquifer.

At block 712, the method includes injecting, via a pump disposed at the injection well, the water through a wellbore of the injection well into an oil reservoir in a subterranean formation associated with the injection well. Thus, the method may include pumping the water through the wellbore into the oil reservoir in a subterranean formation, thereby facilitating pressure maintenance (maintaining pressure) of the oil reservoir or providing for a water flood, or both. In particular, the method may include injecting the water supplied from the aquifer into an oil reservoir via the injection well, thereby facilitating pressure maintenance of the oil reservoir or displacing oil in the oil reservoir toward a production well, or a combination thereof.

An embodiment is a method of corrosion control and scale control in water supply for injection, including specifying a corrosion inhibitor (e.g., an amine-based corrosion inhibitor) for squeeze treatment of a water supply well, specifying a scale inhibitor that can form a complex with the corrosion inhibitor, and pumping the corrosion inhibitor and the scale inhibitor through a wellbore of the water supply well into an aquifer in a subterranean formation. The method includes forming the complex of the corrosion inhibitor and the scale inhibitor. The method includes pumping water from the water supply well to an injection well for injection, the water including the scale inhibitor released from the complex in the aquifer and the corrosion inhibitor released from the complex in the aquifer. The pumping of the water to the injection well may involve pumping the water via an ESP disposed in the wellbore of the water supply well. The method may include injecting, via a pump disposed at the injection well, the water through a wellbore of the injection well into an oil reservoir in a subterranean formation associated with the injection well. The specifying of the scale inhibitor may involve evaluating that the scale inhibitor forms the complex with the corrosion inhibitor. The scale inhibitor may be an organic phosphate compound or a polymeric compound having a carboxyl group, or a combination thereof. In implementations, the scale inhibitor includes the organic phosphate compound that includes a phosphonate or a phosphate ester, or a combination thereof. In implementations, the scale inhibitor includes the polymeric compound having the carboxyl group, and wherein the polymeric compound has molecular mass less than 5000 amu.

Another embodiment is a method of corrosion control and scale control in water supply for injection, including specifying a corrosion inhibitor for a water supply well, specifying a scale inhibitor that forms a complex with the corrosion inhibitor, and pumping the corrosion inhibitor and the scale inhibitor through a wellbore of the water supply well into an aquifer in a subterranean formation, wherein the scale inhibitor forms the complex with the corrosion inhibitor. The method includes providing water from the aquifer via the water supply well to an injection pump at an injection well, the water including the scale inhibitor released from the complex in the aquifer and the corrosion inhibitor released from the complex in the aquifer. The method may include pumping the water through a wellbore of the injection well into an oil reservoir in a subterranean formation, thereby facilitating pressure maintenance of the oil reservoir. The method may include, after the pumping of the corrosion inhibitor and the scale inhibitor into the aquifer, pumping water through the wellbore of the water supply well into the aquifer to displace the corrosion inhibitor and the scale inhibitor further from the wellbore into the aquifer. The method may include, after the pumping of the corrosion inhibitor and the scale inhibitor into the aquifer, shutting in the water supply well for at least 4 hours. The formation rock in the aquifer comprises may include carbonate or clay, or both. The pumping of the corrosion inhibitor and the scale inhibitor through the wellbore of the water supply well into the aquifer may be a batch squeeze treatment of the water supply well with the corrosion inhibitor and the scale inhibitor. The squeeze treatment life of the water supply well with the corrosion inhibitor and the scale inhibitor may be at least 6 months.

Yet another embodiment is a method of corrosion control and scale control in water supply for injection, including specifying a corrosion inhibitor for a batch squeeze treatment of a water supply well, specifying a scale inhibitor that forms a complex with the corrosion inhibitor for the batch squeeze treatment, wherein the scale inhibitor forms the complex with the corrosion inhibitor during the batch squeeze treatment. The method includes performing the batch squeeze treatment. The batch squeeze treatment includes combining the corrosion inhibitor and the scale inhibitor at Earth surface to give a mixture of the corrosion inhibitor and the scale inhibitor, pumping the mixture through a wellbore of the water supply well into an aquifer in a subterranean formation, pumping water through the wellbore into the aquifer to displace the corrosion inhibitor and the scale inhibitor further into the aquifer, and shutting in the water supply well (e.g., for at least 4 hours) for interaction of the scale inhibitor with formation rock in the aquifer. The method includes placing the water supply well into service, thereby supplying water from the aquifer to an injection well, wherein the water supplied from the aquifer includes the scale inhibitor released from the complex in the aquifer and the corrosion inhibitor released from the complex in the aquifer. In implementations, treatment life of the batch squeeze treatment (with respect to both the corrosion inhibitor and the scale inhibitor) is at least 6 months. The supplying of the water from the aquifer to the injection well may include flowing the water from the aquifer through surface piping to the injection well. The supplying of the water from the aquifer to the injection well may include flowing the water from the aquifer through surface piping to a feed vessel for an injection pump at the injection well. The method may include injecting the water supplied from the aquifer into an oil reservoir via the injection well, thereby facilitating pressure maintenance of the oil reservoir or displacing oil in the oil reservoir toward a production well, or a combination thereof.

Figure 8:
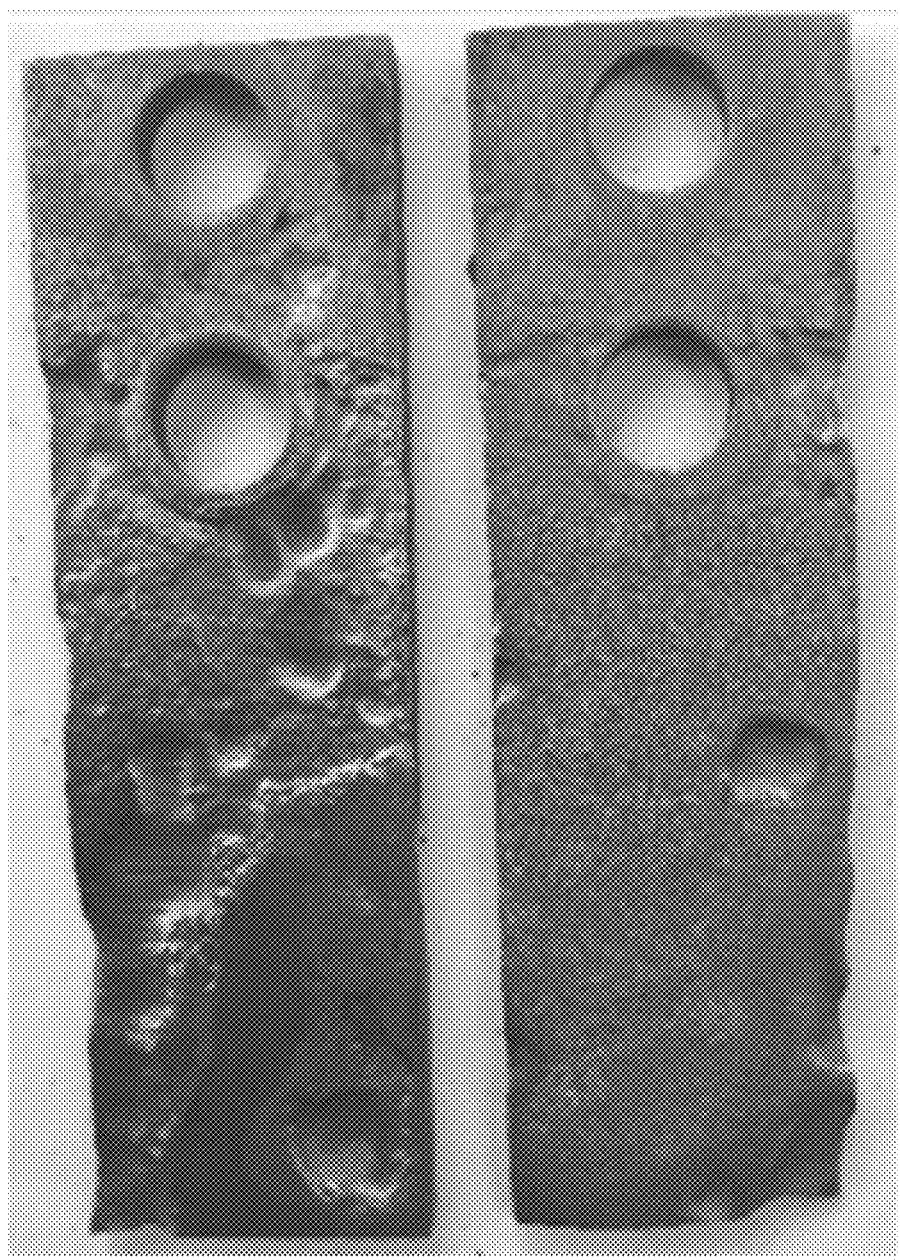
FIG. 8 is an image (photo) of two corrosion coupons exposed for 90 days in a water supply well after squeeze treatment.
Figure 9:
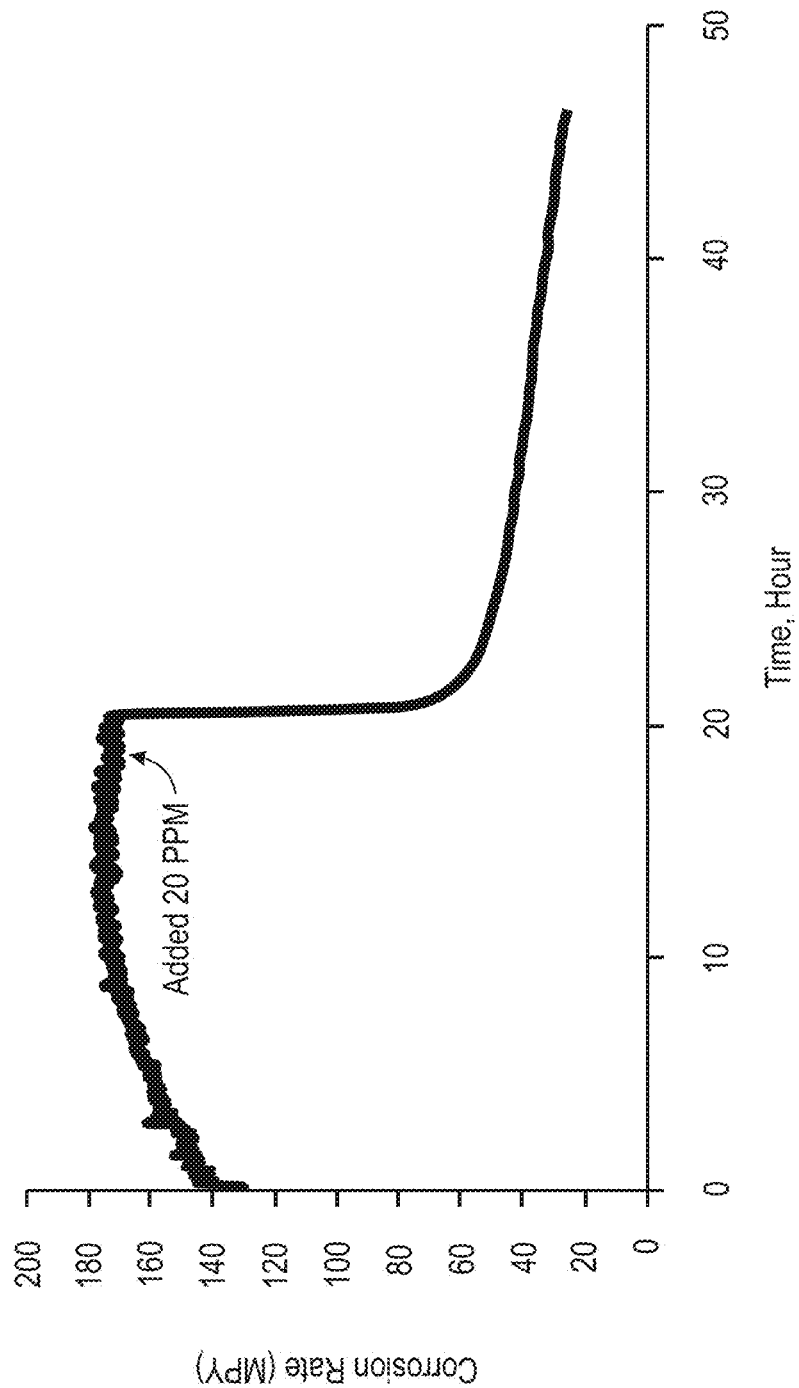
FIG. 9 is a plot of linear polarization resistance (LPR) electrochemical data for a corrosion inhibitor.

In embodiments, initially, effective corrosion inhibitors are identified based on their corrosion inhibition efficacy determined by laboratory tests or field treatment history. For instance, in preparation of the Example below, laboratory efficacy tests to identify effective corrosion inhibitors included [1] linear polarization resistance (LPR), [2] high-pressure high-temperature (HPHT) rotating cage, and [3] rotating cylinder. Some test results are shown in FIGS. 8 and 9. Corrosion inhibitors CI-1, CI-2, CI-3, CI-4, and CI-5 were evaluated. See below in the Example for a description of these five corrosion inhibitors.

The HPHT rotating cage is an autoclave (pressure vessel) utilized to perform the HPHT rotating cage test that measures weight loss of carbon-steel specimens (coupons) placed in the autoclave. Thus, the rotating cage (RC) may be characterized as a specimen holder for rotating coupons, and with the resulting weight-loss data relied on for corrosion-inhibitor selection.

FIG. 8 depicts images (photos) of two corrosion coupons (carbon steel) exposed for 90 days in the water supply well #A system (see below) after squeeze treatment with corrosion inhibitor. The corrosion inhibitor used in the same for the coupon on the left and on the right. The corrosion loss was relatively severe, measured at exceeding 40 mils penetration per year (mpy). The unit mil is one thousandth of an inch.

The LPR test is an electrochemical technique that monitors corrosion rate. FIG. 9 is a plot of LPR electrochemical data for 20 ppm (by weight) of corrosion inhibitor CI-3 (see below) at 54° C. and 1 atmosphere (atm) of $CO_2$ in synthetic brine representing water supply well #A system.

As for the rotating cylinder test, that test was performed at ambient and at 100 pounds per square inch gauge (psig) of $CO_2$ pressure and 50-80° C. Rotating cylinder test results are not indicated in the figures. A rotating cylinder autoclave test may be utilized to evaluate and screen corrosion inhibitors. The rotating cylinder as a rotating cylinder electrode (RCE) is a piece of equipment used to measure the corrosion rate in materials. Other tests are applicable.

After evaluating to identify effective corrosion inhibitors, scale inhibitors may be evaluated (and can be selected) based on their ability to form an insoluble complex under the aquifer reservoir conditions with the identified (pre-determined) corrosion inhibitors evaluated and selected. As discussed, scale inhibitors may be either polymeric compounds with a carboxyl group with molecular weight less than 5000 or organic phosphate compounds such as phosphonates and phosphate esters. These two types of scale inhibitor are typically very effective in preventing scale formation in aquifer waters.

Figure 10:
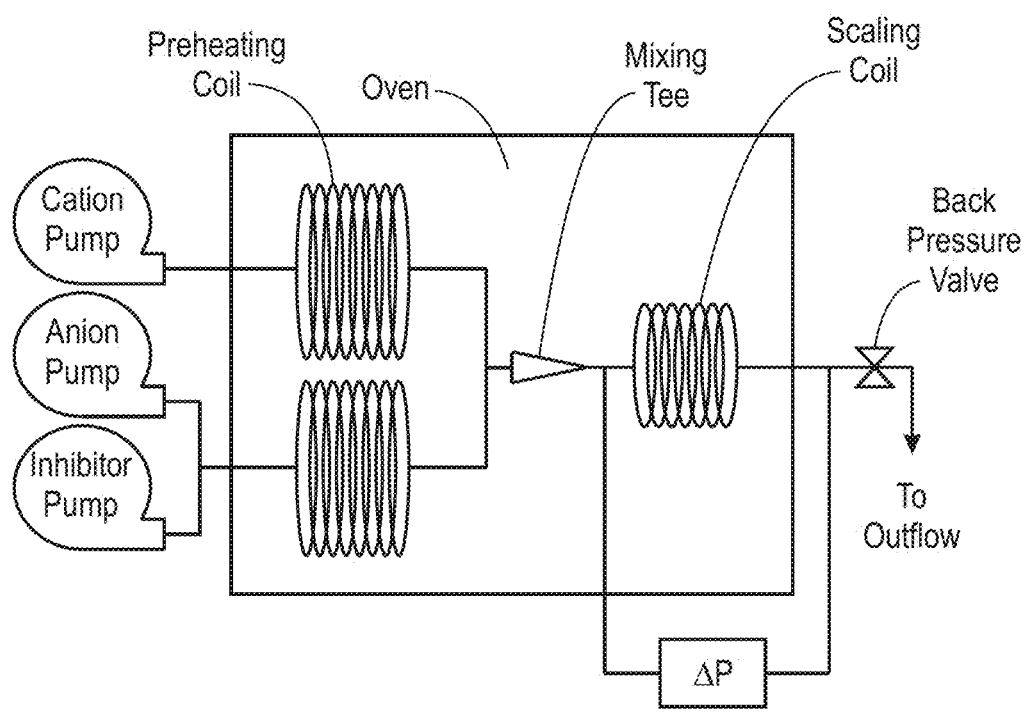
FIG. 10 is a diagram of a dynamic tube blocking (DTB) apparatus utilized to evaluate scale inhibitors.

FIG. 10 is a dynamic tube blocking (DTB) apparatus utilized to evaluate scale inhibitors in preparation of the Example below. Tests conducted employing the DTB apparatus were performed on scale inhibitors SI-1, SI-2, SI-3, SI-4, and SI-5. See below in the Example for a description of these five corrosion inhibitors. For the DTB tests, synthetic anion brine was prepared that included sodium chloride, sodium bicarbonate and sodium sulfate. Synthetic cation brine was prepared containing chloride salts of calcium, magnesium, strontium and sodium. A 1:1 [by volume] mixing of these two synthetic brines yielded the well #A aquifer water given in Table 1 that lists the chemical composition for well #A aquifer water.

TABLE 1

| Well #A aquifer water composition | |
|---|---|
| Ion | mg/L |
| Sodium (Na) | 16000 |
| Potassium | 337 |
| Magnesium | 643 |
| Calcium | 3326 |
| Strontium | 55 |
| Chloride | 32380 |
| Sulfate | 886 |
| Bicarbonate | 176 |

Figure 11:
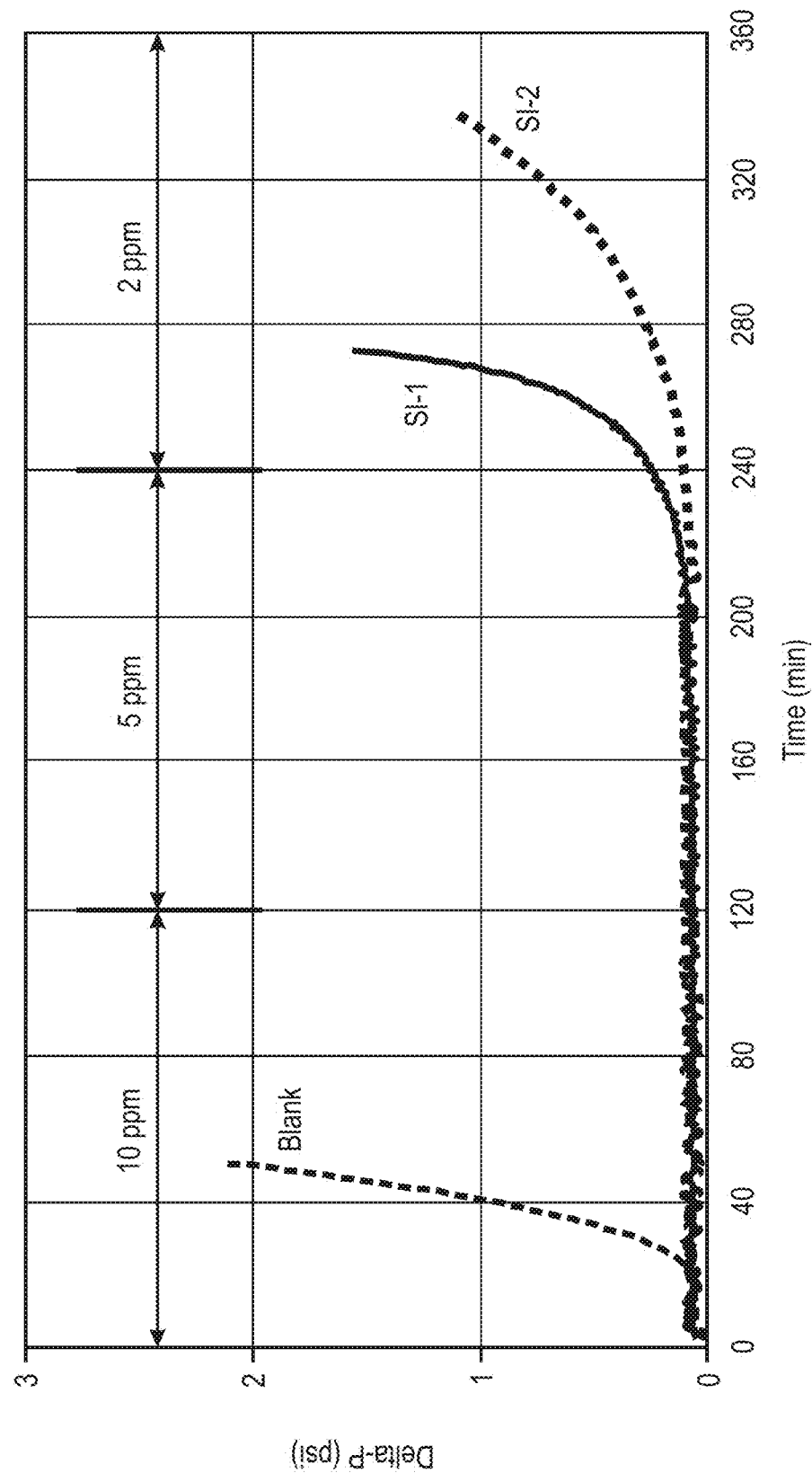
FIG. 11 is a plot of laboratory DTB apparatus test results on two scale inhibitors.

FIG. 11 is a plot of the laboratory DTB apparatus test results on two scale inhibitors (SI-1 and SI-2) with the well #A aquifer water composition as listed in Table 1. The aforementioned synthetic anion brine and synthetic cation brine were utilized, as discussed. FIG. 11 is a plot of delta pressure ($\Delta P$) (psi) over time in minutes (min). The ppm concentration of the scale inhibitors is given. The blank means no scale inhibitor.

Referring to FIG. 10 for the DTB apparatus laboratory tests, scale inhibitor was mixed with the anion brine. The synthetic brines were pumped into the preheating coils first and then comingled at the mixing tee to form the scaling brine. The differential pressure (delta-P or $\Delta P$) across the stainless steel scaling coil [1 meter long, 1-millimeter (mm) inner diameter (ID)] was continuously measured and recorded. Scale formation was indicated by the increase in $\Delta P$. The scaling time was defined as the time for $\Delta P$ to reach 1 pound per square inch (psi). The scaling time for blank brine (without scale inhibitor), termed as blank time, was determined first. The test duration for scale inhibitor was set at about 3 times of blank time, as the industry common practice. Scale inhibitor concentration was decreased stepwise if increase in $\Delta P$ was smaller than 1 psi over the test duration. The MED value was the minimum inhibitor concentration to keep the increase in $\Delta P$ below 1 psi over the test duration.

The test temperature in the DTB apparatus tests with results depicted in FIG. 11 was 221° F. (105° C.), which represented the downhole ESP temperature. In the field in practice, the most severe calcium carbonate ($CaCO_3$) deposition generally occurs at the ESP in the water supply well system due to heating by ESP motor and turbulent flow inside of ESP pump stages. In the DTB apparatus tests, the blank scaling time was about 40 min at this temperature. The scale-inhibitor test duration was 120 min. No increases in $\Delta P$ were observed for inhibitors SI-1 and SI-2 at 10 ppm (FIG. 11). These two scale inhibitors were also effective at 5 ppm but failed at 2 ppm. Thus, the MED values for these two scale inhibitors were between 2 and 5 ppm.

Embodiments herein may generally rely on commercially available corrosion inhibitors and commercially available scale inhibitors, both of which are relatively limited in number (for protection of water well supply and downstream injection) and not a wide universe. Moreover, the present techniques do not require that all corrosion inhibitors be evaluated or that all scale inhibitors be evaluated. Instead as little as one of each, or a handful (e.g., 2 to 5) at most of each, may be evaluated. Further, the evaluation of the corrosion inhibitor(s) is straightforward as indicated herein. The evaluation of whether a scale inhibitor may form a complex with the corrosion inhibitor(s) is also straightforward, as indicated in the Example below.

Example

This Example is presented only as an example and not intended to limit the present techniques. Static jar tests with jars having a volume of 100 mL were conducted to evaluate the tendency of some effective commercial corrosion inhibitors and scale inhibitors for aquifer waters to form insoluble complexes between the corrosion inhibitor and the scale inhibitor. Evaluated were four corrosion inhibitors (CI-1, CI-2, CI-4, and CI-5) and five scale inhibitors (SI-1, SI-2, SI-3, SI-4, and SI-5). CI-3 was also tested, but no complex was formed under the test conditions. This does not rule out that CI-3 can form the insoluble complex with other scale inhibitors or the tested scale inhibitors under different conditions. Lastly, for corrosion inhibitors not soluble in the water, the corrosion inhibitor is dispersible in water and may make the water cloudy, but the corrosion inhibitor alone in the water is not solid particles.

To perform the static jar tests, the nine inhibitor products indicated in Tables 2-4 below were diluted to 25 volume percent (vol %) with the synthetic well #A water (Table 1). Then, respective corrosion inhibitors as diluted were mixed with respective scale inhibitors as diluted at 1:1 volume ratio in a respective jar at the ambient condition. Once mixed, the jar was kept static to simulate the field operation of a well shut-in period of about 18 hours to 24 hours after pumping a mixture of a corrosion inhibitor and a scale inhibitor into the aquifer reservoir.

One set of mixed samples was kept at ambient condition and the formation of insoluble complex was examined after 4 hours. Another set of the mixed samples was placed into a preheated oven at aquifer temperature of 176° F. (80° C.) and observed after 2 hours and 18 hours. Test results are summarized in Tables 2 to 4, with "Y" denoting that an insoluble complex formed and "N" denoting no insoluble complex observed. The insoluble complex was deemed formed by visual observation of solid precipitates (formed by interaction between the corrosion inhibitor and the scale inhibitor) in the jar. For instances with no solid precipitates observed in the jar, an insoluble complex was deemed as not formed.

TABLE 2

Test results at ambient temperature (~22° C.) after 4 hours

|      | CI-1 | CI-2 | CI-4 | CI-5 |
|------|------|------|------|------|
| SI-1 | N    | Y    | N    | N    |
| SI-2 | N    | N    | Y    | Y    |
| SI-3 | N    | N    | Y    | N    |
| SI-4 | N    | Y    | Y    | Y    |
| SI-5 | N    | Y    | Y    | N    |

TABLE 3

Test results at 176° F. (80° C.) after 2 hours

|      | CI-1 | CI-2 | CI-4 | CI-5 |
|------|------|------|------|------|
| SI-1 | N    | Y    | N    | N    |
| SI-2 | N    | N    | Y    | Y    |
| SI-3 | N    | N    | Y    | N    |
| SI-4 | Y    | Y    | Y    | Y    |
| SI-5 | N    | Y    | Y    | N    |

TABLE 4

Test results at 176° F. (80° C.) after 18 hours

|      | CI-1 | CI-2 | CI-4 | CI-5 |
|------|------|------|------|------|
| SI-1 | Y    | Y    | Y    | N    |
| SI-2 | N    | N    | Y    | Y    |
| SI-3 | N    | N    | Y    | Y    |
| SI-4 | Y    | Y    | Y    | Y    |
| SI-5 | Y    | Y    | Y    | N    |

CI-1 is Cortron® AR-505 corrosion inhibitor is an amine-based corrosion inhibitor that is a blend of imidazoline, fatty amine, and quaternary ammonium compounds. Cortron® AR-505 is dark brown liquid with specific gravity of 1.05 at 15.5° C. Cortron® AR-505 is available from Nalco Champion Chemical Company having headquarters in Sugar Land, Texas, USA.

CI-2 is MULTITREAT 1706 corrosion inhibitor that is quaternary ammonium compounds. MULTITREAT 1706 is available from Clariant International Ltd. having headquarters in The Woodlands, Texas, USA.

CI-3 is Cortron™ KRN227 corrosion inhibitor available from Nalco Champion Chemical Company and is a blend of imidazoline, fatty amine, and quaternary ammonium compounds.

CI-4 is CRW-22051 corrosion inhibitor that is a blend of tail oil fatty acid and pyridinium. CRW-22051 is available from Baker Hughes Company having headquarters in Houston, Texas, USA.

CI-5 is CORR-11941A corrosion inhibitor available from Nalco Champion Chemical Company and is based on ethoxylated fatty amine].

SI-1 is SCAL12859A scale inhibitor available from Nalco Champion Chemical Company and is a phosphate ester.

SI-2 is Durasale 5502 scale inhibitor is a prosperity phosphoric acid derivative. Durasale 5502 is available from German Metal Surface Treatment Chemicals Co. (SUGEST) having headquarters in Riyadh, Saudi Arabia.

SI-3 is SCW22178 scale inhibitor available from Baker Hughes Company and is based on diethylenetriamine penta (methylene phosphonic acid).

SI-4 is SCALETREAT 12682 scale inhibitor available from Clariant International Ltd. and is a polymaleic copolymer.

SI-5 is Gyptron® KT-126 scale inhibitor available from Nalco Champion Chemical Company and is a partially neutralized amino tri(methylene phosphonic acid).

A number of implementations have been described. Nevertheless, it will be understood that various modifications may be made without departing from the spirit and scope of the disclosure.

What is claimed is:

1. A method of corrosion control and scale control in water supply for injection, comprising:
   specifying a corrosion inhibitor for squeeze treatment of a water supply well;
   specifying a scale inhibitor that can form a complex with the corrosion inhibitor;
   pumping the corrosion inhibitor and the scale inhibitor through a wellbore of the water supply well into an aquifer in a subterranean formation;
   forming the complex of the corrosion inhibitor and the scale inhibitor; and
   pumping water from the water supply well to an injection well for injection, the water comprising the scale inhibitor released from the complex in the aquifer and the corrosion inhibitor released from the complex in the aquifer.

2. The method of claim 1, wherein pumping the water to the injection well comprises pumping the water via an electrical submersible pump (ESP) disposed in the wellbore of the water supply well.

3. The method of claim 1, comprising injecting, via a pump disposed at the injection well, the water through a wellbore of the injection well into an oil reservoir in a subterranean formation associated with the injection well.

4. The method of claim 1, wherein specifying the scale inhibitor comprises evaluating that the scale inhibitor forms the complex with the corrosion inhibitor.

5. The method of claim 1, wherein the corrosion inhibitor comprises an amine-based corrosion inhibitor.

6. The method of claim 1, wherein the scale inhibitor comprises an organic phosphate compound or a polymeric compound having a carboxyl group, or a combination thereof.

7. The method of claim 6, wherein the scale inhibitor comprises the organic phosphate compound, and wherein the organic phosphate compound comprises a phosphonate or a phosphate ester, or a combination thereof.

8. The method of claim 6, wherein the scale inhibitor comprises the polymeric compound having the carboxyl group, and wherein the polymeric compound comprises a molecular mass less than 5000 atomic mass units (amu).

* * * * *